G. F. Woolston,
Blind Slat Mach.
No. 112,666. Patented Mar. 14, 1871.

Witnesses:
F. C. Brecht.
Chas. Hadaway.

Inventor:
George F. Woolston.
By N. Crawford
atty.

UNITED STATES PATENT OFFICE.

GEORGE F. WOOLSTON, OF WASHINGTON, DISTRICT OF COLUMBIA.

IMPROVEMENT IN BLIND-SLAT MACHINES.

Specification forming part of Letters Patent No. 112,666, dated March 14, 1871.

*To all whom it may concern:*

Be it known that I, GEORGE F. WOOLSTON, of the city of Washington, in the county of Washington, in the District of Columbia, have invented certain Improvements in Machines for Making Window-Blind Slats and other Similar Articles, of which the following is a specification.

This invention has for its object the construction of a machine for producing in a complete finished state from the rough plank such articles as slats for window-blinds, muntins and bars for window-sash, or any small pieces of wood of which a large number of the same width and thickness are required, and which are produced in a finished state from the plank by once passing through the machine, where they are slit to the thickness by saws, planed on the sides, and such moldings wrought upon the edges as fancy dictates; and it consists in the construction, arrangement, and combination of the parts of the machine that produce the result.

Figure 1:
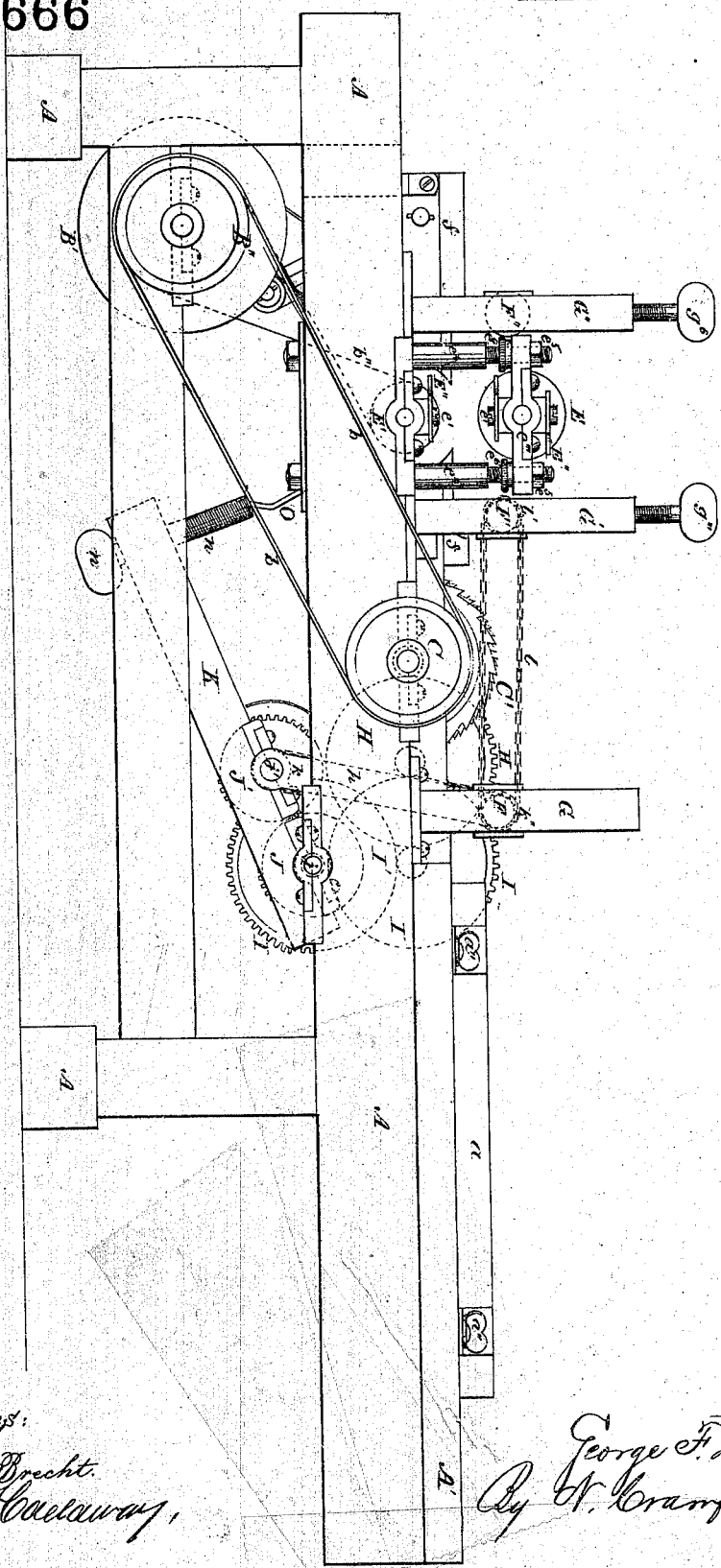
Figure 2:
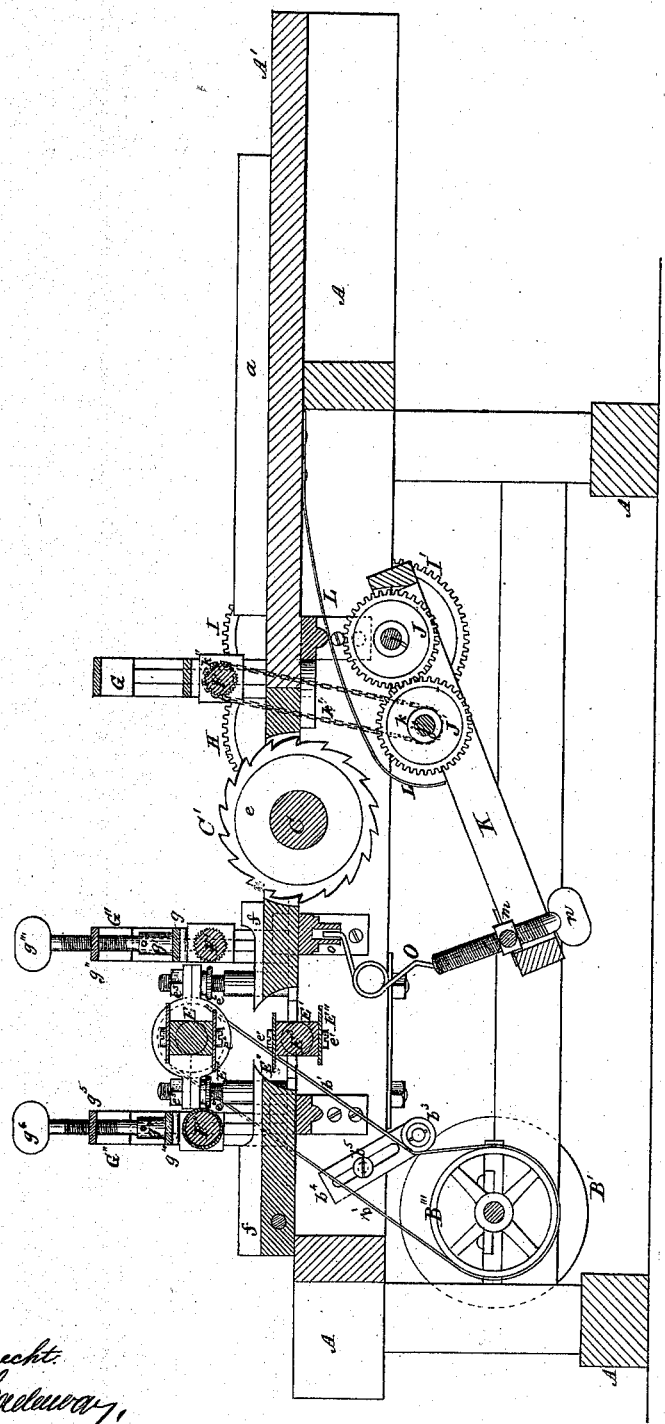
Figure 3:
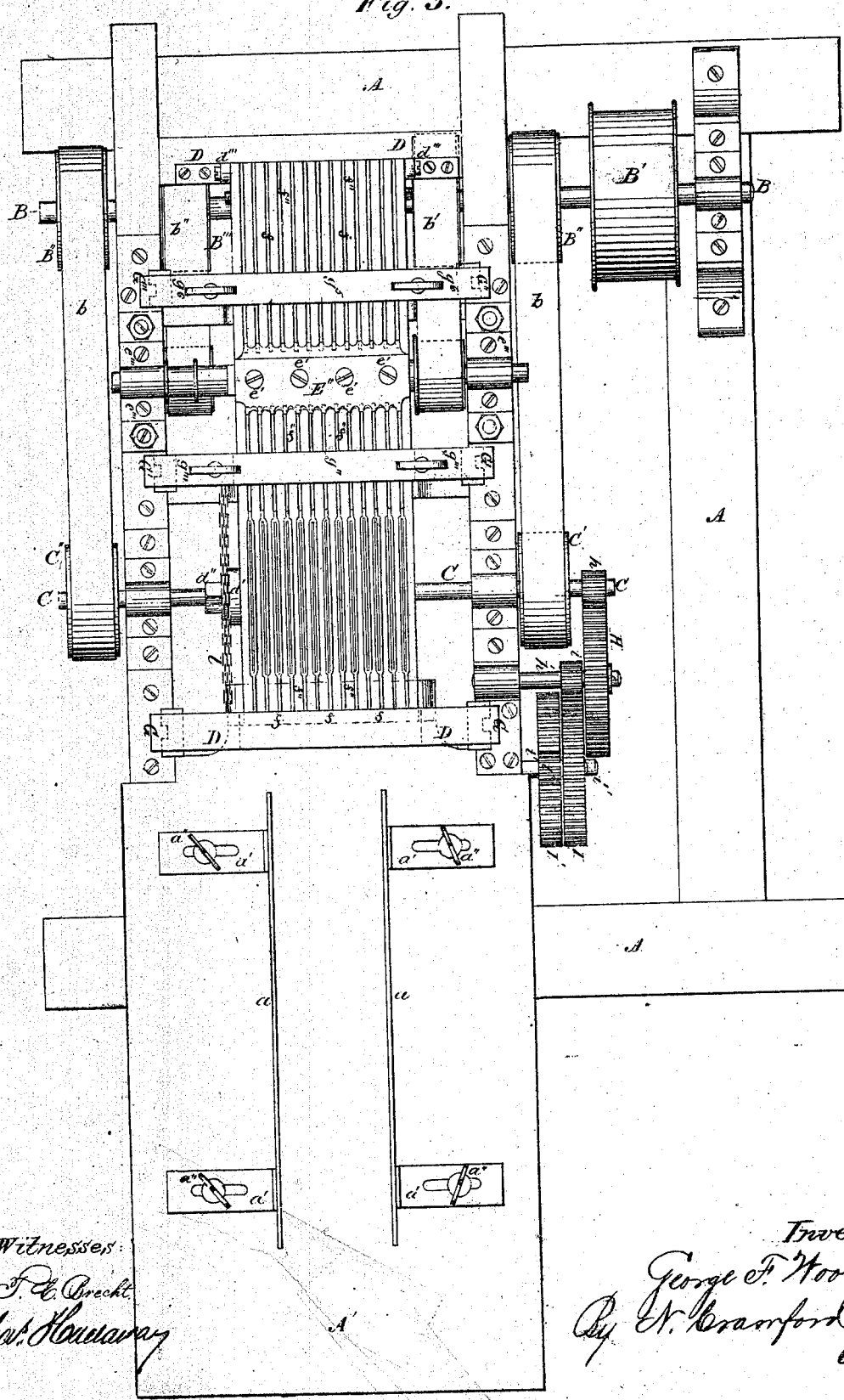
Figure 4:
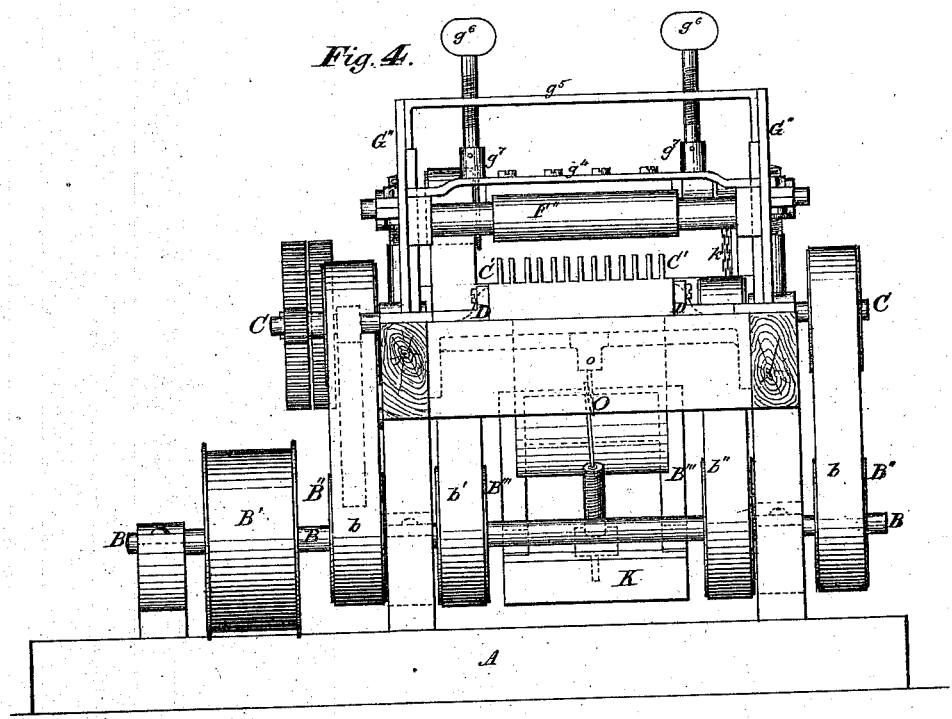
Figure 5:
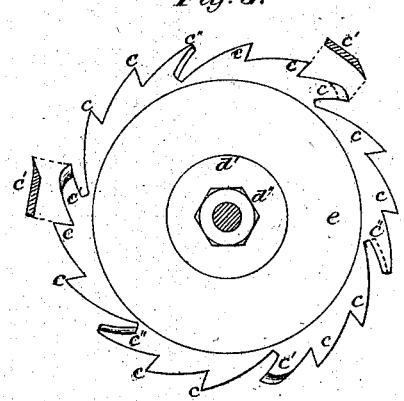
Figure 6:
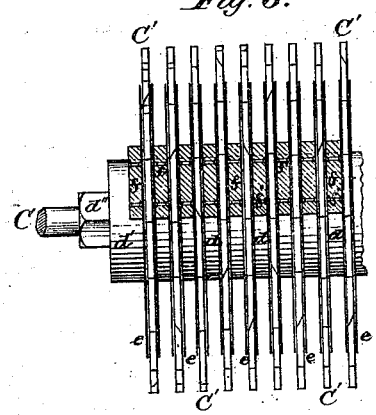

In the drawings, Figure 1 is a side view of the machine. Fig. 2 is a longitudinal sectional view of Fig. 1. Fig. 3 is a top plan view. Fig. 4 is an end elevation. Fig. 5 is a side view of the saws and plates, and Fig. 6 is a longitudinal sectional view of the gang of saws and their connections.

A represents the frame that supports the operating parts; A', the table upon which the rough plank to be made into slats is placed.

$a\ a$ are adjustable guides made to slide upon the top of table A', and are adjustable thereon by means of the slotted arms $a'\ a'$, attached thereto, and held in any desirable position by the holding-screws $a''\ a''$, which are screwed into nuts fast in the table A'. This construction allows the guides to be adjusted either to the right or the left, and so as to coincide in direction with the saws and the guides in the line of the saws.

B is the main driving-shaft, placed transversely across the machine and near its forward end, and being free to revolve on bearings in proper boxes.

B' is the driving-pulley, that is fast upon shaft B.

B'' B'' are two other pulleys on shaft B, that give motion to the saws and feed-rollers.

B''' B''' are two pulleys on shaft B, that give revolution to the planer or molding-heads.

C is a transverse shaft, upon which are made fast the gang of circular saws C'. The shaft revolves on bearings in suitable boxes on the framing A, and is revolved by means of belts $b\ b$, that pass around pulleys B'' on shaft B and pulleys C'' on shaft C. The saws C', that compose the gang, have the ordinary slitting-teeth, $c\ c$, Fig. 5, in series, and there are also a sufficient number of planing-teeth, $c'$ and $c''$, interposed between the series of teeth $c$, to plane the sides of the kerf cut by the slitting-teeth $c$, as seen in said Fig. 5. The teeth $c$ are swaged to cut the width of the kerf, and must be broad enough to cut the kerf sufficiently wide to allow perfect freedom of revolution to the saw. The planer-teeth $c'$ are constructed as seen in Fig. 5, and their cutting-edges in such position that they have a backward cut—that is, the front part of the planing-tooth is in advance of the cut that is on the back of the tooth. These teeth $c'$ are beveled to edges and set to opposite sides of the saw-plate, and so as to cut a thin shaving from each side of the kerf. The planing-teeth $c''$ are formed in hook shape on their cutting or planing edges, which are set to opposite sides of the saw-blade, and so as to cut with a draw cut; or they may be curved slightly, so that the cutting shall be done at or nearly at the center of the projection of the tooth, and by being slightly wider in their set than teeth $c'$, will finish up the planing process and leave the surface of the wood smooth and perfect in finish. Any number of these saws may be used in a gang, according to the width of plank used in making the slats with. The saws forming the gang are placed upon the saw-shaft C, and of the proper width apart for the thickness of the slats, as may be desired, and fastened in such position with relation to each other as may be wished by any known device for such purpose.

The washers $d$, that are used to separate the saws the proper width apart, are also placed upon the saw-shaft and between the saws, and are made of such thickness as to have the saws cut and plane the slats to the thickness desired.

Outside of the saws there are washers $d'$, that bear against the outsides of the saws, and are held firmly in contact with the saws by screw-nuts $d''$, turning on screw-threads on shaft C, and thus hold the gang of saws, with the intermediate washers, $d$, that gage the distance between the saws, firmly and securely in their position.

$e\ e\ e$ are thin metal disks or plates of less diameter than the saw, and having a center opening, to freely receive the washers $d$ upon shaft C and have them revolve in such opening. These disks are made fast to the longitudinal adjustable guides $f\ f\ f$, that are placed on both sides of and between each saw, forming a guideway to prevent the slat from touching the saw while passing between them and guide them in their passage between the edge-planers, to be finished before they leave the machine by means of holding-screws $f'\ f'$, passing through the disk into a screw-hole in the guides $f$, as seen in Fig. 6. The guide plates or ways $f\ f\ f$ are of metal, though they may be made of wood or other material that will answer as well, and are constructed to receive the saws C' and disks $e$ between them, and are placed in a frame or clamp, D, in such manner as to be adjustable nearer to or farther from each other (as the saws are adjusted) by placing adjusting-blocks $f''$, that form the bed and upon which the slats slide, between them, and then clamping them together by clamping-screws $d''$, as seen in Fig. 3. These guide-ways continue the entire length of the machine, except where they are cut away to admit the under cylinder-cutter to plane the lower edge of the slat, and are supported on as many transverse clamp-frames D as may be necessary to give them proper solidity and strength.

E and E' are revolving cylinders, having adjustable cutters E'' upon them, by which the edges of the slats are planed or molded, as desired. The cutters E'' may be plain or straight on their cutting-edges; or they may have any shape that will give such configuration to the edge of the slat as may be desired, as they can be changed from the cylinder and have as many different cutters attached as wanted, and they are held, when adjusted, by means of the holding-screws $e'\ e'$. The cylinder E' is upon a shaft, $E^3$, that is journaled and revolves in boxes that are attached to the main frame A, and in such position that the circuit of the cutters in their revolution will just be above the bed of the machine between the guideways $f\ f\ f$, before the cylinder, and dress the lower edge of the slats, when they will rest on the bed between the guideways, which is a little higher after passing the cylinder than before it. Cylinder E is journaled in and supported on adjustable boxes $e'''$, which are made to slide vertically on upright screw-posts $e^4\ e^4$, and adjusted thereon by the adjusting-nuts $e^5$ and $e^6$, so that the upper cylinder is adjusted to any desired width of slat.

To feed the stuff to the saws and conduct it through the operation of sawing, planing the sides, and molding the edges of the slats, revolving feed-rollers F, F', and F'' are employed. Feed-roller F is used to feed the rough plank to the saws, and is located so as to take hold of the plank before it reaches the saws, while roller F' takes hold of and conducts the slats after being sawed and planed on their sides to the revolving cutters, that plane or mold the edges, while roller F'' takes hold of the edges of the slats after they are planed or molded on their edges and conducts them in order out of the machine finished. Feed-roller F is fluted longitudinally, so as to have a better hold upon and feed the stuff to the saws without slipping on the surface of the plank, and is journaled in sliding boxes that freely slide between upright posts G G, the journal-boxes having grooves on their sides that slide in a tongue on the posts, by which means they are kept in a vertical position as they slide to accommodate the different thickness of plank that is feed into the machine. Feed-roller F' is journaled in boxes that slide between upright posts G', and is made to be adjusted to stuff or slats of different widths by means of the cross-girt $g$, which goes transversely across between the upright posts G', and is firmly attached to the journal-boxes in which the roller F' revolves, and upon the top side of said cross-girt $g$ are raised thimbles $g'\ g'$, in which the lower ends of temper-screws $g'''$ are pivoted.

On the top of posts G' G', and fast thereto, is cross-girt $g''$, through which are holes, with screw-thread tapped therein, which are vertically above the thimble $g'\ g'$. The temper-screws $g'''$ are screwed through the holes in cross-girt $g''$ and go into the top of the thimbles $g'$ on cross-girt $g$, and are made fast thereto, and by turning the screws $g'''$ the cross-girt $g$, with the journal-boxes and feed-roller F', will be adjusted higher or lower, as the direction in which the screws $g'''$ are turned will determine.

Feed-roller F' is also fluted longitudinally, like F; or it may have a plain or other corrugated surface, as may be best for the work to be fed along by it. Feed-roller F'' is constructed and arranged in a similar manner as roller F', and is between two upright posts, G'', with cross-girts $g^4$ and $g^5$, and regulated by screws $g^6$ in the same manner as above described for F', the only difference being in the construction of the face of the roller, which is smooth and straight on its face; or it may have grooves cut transversely to its axis that will conform to the shape of the edge of the slat as finished by the revolving cutters on the cylinder E.

The planing or molding cutter-cylinder E is revolved by a belt, $b'$, from pulley B''' on the main transverse driving-shaft to a pulley on the cylinder-shaft. The under cutter-cylinder is revolved by belt $b''$ from and around pulley B'' to and around a pulley on the shaft of the cylinder E'. The belt $b'$ is kept at the right strain by means of a strain-pulley, $b^3$, attached to an axle on sliding and slotted plate $b^4$, held by holding-screw $b^5$, as shown in Fig. 2.

In order to give the feed-roller F liberty to rise and fall, and to be in contact with the plank, varying in thickness, sufficiently hard to not slip thereon, and consequently not feeding it into the machine, a device novel in construction and operation is introduced to produce the desired result.

Upon the end of saw-shaft C is a toothed gear-wheel, $h$, which is revolving at high speed. This wheel $h$ gears into gear-wheel H, of larger size and more teeth, on shaft $h'$, and upon this shaft is a toothed-pinion gear-wheel, $i$, gearing into gear-wheel I on shaft $i'$. On shaft $i'$ is another toothed pinion, $i''$, gearing into gear-wheel I' on transverse shaft $j$, which is journaled in boxes on the under side of the main plate of frame A, and traverses the whole width of the frame.

On the center of the length of shaft $j$ is made fast gear-wheel J, which gears into gear-wheel J' on short shaft $j'$. As the transverse shaft $j$ crosses the machine, it passes through boxes, in which it revolves, on the end of frame K, and gives support to said frame at the end to which it is so attached. Shaft $j'$ is journaled in boxes on frame K, and extends some distance to each side of said frame K, and at each end thereof has sprocket-wheels $k$, which, by the means of sprocket-chain $k'$, going around sprocket-wheels $k''$ on the outer ends of feed-roller F, gives revolution to it, and sprocket-chain $l$, running from and around roller F to and around sprocket-wheels $l'$ on roller F', gives revolution also to that roller, and, if desired, roller F'' can be revolved by the same means when necessary.

Near the forward end of the pendent frame K is a transverse rock-shaft, $m$, journaled in boxes attached to the frame, and in the center of its length is a square section large enough to receive the graduating-screw $n$ in a hole having a screw-thread therein, as seen in Fig. 2.

At the top or upper end of the graduating-screw $n$ is a hole made centrally in its end, to receive the end of the bent wire spring O, which is bent and coiled one turn or more around in the center of its length, and the other end is bent and loosely inserted in thimble $o$, that is firmly attached to the under side of the frame A, or to any other convenient part of the machine.

At each end of the shaft $j'$, and outside of the sprocket-chains, is a stirrup-connection, $p$, which rigidly connects shaft $j$ with the feed-roller F by having the feed-roller shaft and shaft $j'$ pass through holes for that purpose in the ends of the stirrups $p$. By thus connecting the feed-roller F with the shaft $j'$ and the shaft $j'$ in a flexible frame, made so by the bent and coiled spring O and the graduating-screw $n$, the feed-roller will surely accommodate itself to plank of different thickness, and by turning the graduating-screw $n$ the roller will be made to have the same amount of pressure on a thin as on a thick plank, and the amount of pressure can be increased at any time by turning the screw so as to compress the spring O, thus causing the spring to exert a greater force upon the feed-roller through the screw $n$, frame K, and connecting-stirrups $p$.

L is a metal shield to protect gear-wheels J and J' from the dust and shavings from the gang of saws.

Having thus described my invention, what I desire to claim, and desire to secure by Letters Patent, is—

1. The gang of circular saws C', each having the teeth $c$, $c'$, and $c''$, in combination with the metal disks $e$, constructed and arranged to operate in the manner described.

2. The adjustable guides $f$ $f$ $f$, in combination with the gang of adjustable saws having the slitting-teeth $c$ and planing-teeth $c'$ and $c''$, and edge-planing cylinders E and E', with cutters E'', constructed and arranged to operate in the manner described.

3. The bent and coiled spring O, screw $n$, rock-shaft $m$, and frame K, with the revolving shaft $j'$, connecting-stirrups $p$, and feed-roller F, all constructed and arranged to operate in the manner described.

4. The blind-slat machine above described, consisting of the combination of the adjustable feed-rollers F F' F'', and the means of operating them, the gang of adjustable circular and planing saws C', adjustable guides $f f f$, and planing-cylinders E and E', with their cutters E'', when constructed and arranged in its several parts to operate in the manner and for the purpose set forth.

GEORGE F. WOOLSTON

Witnesses:
EDWIN A. STEVENS,
JAMES STOKES.